UNITED STATES PATENT OFFICE.

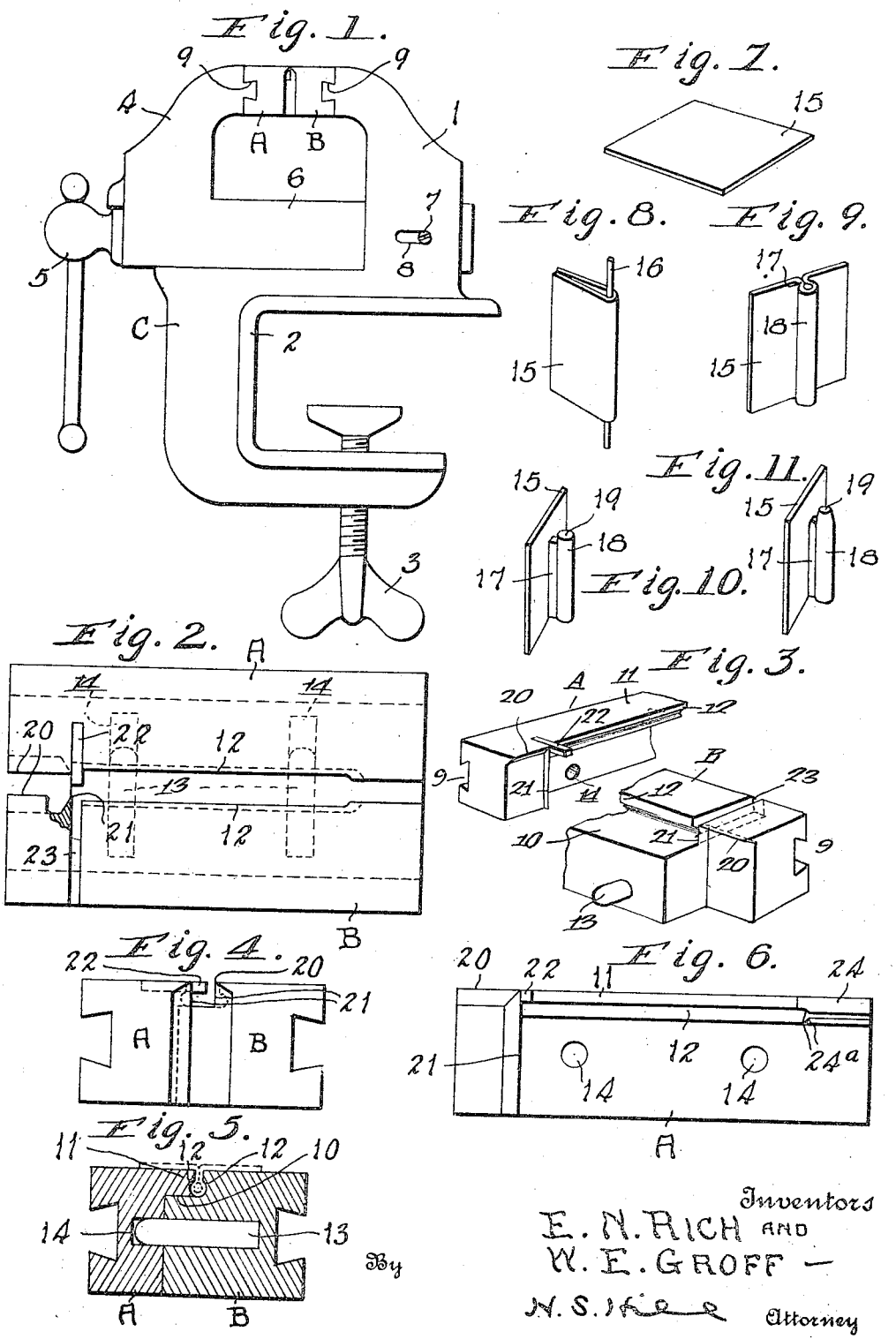

EDWIN N. RICH AND WILLIAM E. GROFF, OF SANTA FE, NEW MEXICO; SAID RICH ASSIGNOR TO SAID GROFF.

PROCESS AND APPARATUS FOR MAKING TOOTH-BACKINGS.

1,257,120.

Specification of Letters Patent. Patented Feb. 19, 1918.

Application filed August 18, 1916. Serial No. 115,628.

*To all whom it may concern:*

Be it known that we, EDWIN N. RICH and Dr. WILLIAM E. GROFF, citizens of the United States, residing at Santa Fe, in the county of Santa Fe, State of New Mexico, have invented a new and useful Process and Apparatus for Making Tooth-Backings; and we do hereby declare the following to be a full, clear, and exact description of the invention, such as will enable others skilled in the art to which it appertains to make and use the same.

The present invention relates to a device for making one-piece artificial tooth backings on which can be mounted the well-known Steele facings for dental uses, the invention embodying novel features whereby the backings can be formed from an ordinary piece of sheet gold, such as dentists usually carry in stock, and which avoids the necessity for filing, grinding, and fitting in order to produce backings which will properly engage the undercut grooves of the Steele facings.

Further objects of the invention are to provide an apparatus for producing these artificial tooth backings which is comparatively simple and inexpensive in its construction, which enables a one-piece solid gold backing to be quickly and accurately made, which avoids the loss of gold in filing and fitting, and which eliminates the necessity of all tedious hand finishing.

With these and other objects in view, the invention consists in a novel process and in an apparatus embodying certain novel combinations and arrangements of parts as will more fully appear as the description proceeds, the novel features thereof being pointed out in the appended claims.

For a full understanding of the invention, reference is to be had to the following description and accompanying drawing, in which:—

Figure 1 is an end view of a vise for forming artificial tooth backings constructed in accordance with the invention.

Fig. 2 is an enlarged top plan view of the removable jaws of the vise, said jaws being shown as separated or moved apart.

Fig. 3 is a perspective view of the ends of the jaw members which are provided with the cutting edges, said jaw members being shown as detached from the device.

Fig. 4 is an end view of the jaws, showing the clipping or shearing edges.

Fig. 5 is a transverse sectional view through the opposed jaws, an artificial tooth backing being indicated in position between the jaws by dotted lines.

Fig. 6 is a side elevation of the working face of one of the jaws.

Figs. 7, 8, 9, 10 and 11 are detail views illustrating the successive steps in forming a one piece backing plate from a flat plate of sheet metal.

Corresponding and like parts are referred to in the following description and indicated in all the views of the drawings by the same reference characters.

In carrying out the invention a pair of specially formed jaws A and B are mounted in such a manner that they can be forcibly moved toward and away from each other, being shown in the present instance as arranged upon the opposed members of a conventional vise C. The fixed member 1 of the vise is rigid with a base 2 which is constructed to be clamped upon the edge of a table or like support by a clamping screw 3. The movable member 4 is arranged to be manipulated by the usual handle 5, and is formed with a lateral arm 6 which passes slidably through a guide opening in the fixed member 1, being engaged by a screw or pin 7 which operates within a slot 8 in the member 1 and coöperates with the ends of the said slots to limit the back and forth movement of the jaws A and B.

The special jaws A and B may be mounted upon the members of the vise in any suitable manner, although in the present instance they are shown as detachably secured thereto by means of the dove-tail joints 9. The upper edge of the jaw B is rabbeted to provide a ledge 10 which is parallel to the upper face of the jaw and at a fixed depth below the same, and the jaw A is formed with an extension 11 which extends over the ledge 10 and is slidable thereon. Corresponding die faces 12 are provided at the end of the extension 11 and upon the vertical portion of the rabbeted edge of the jaw B, the lower portions of the die faces being undercut to provide for the formation of the enlarged rib upon the web of the backing plate. In order to hold the jaws A and B in a proper relation to each other at all times, one of the said jaws, in the present instance the jaw B, is provided with dowel pins 13, the ends of which slide within guide openings 14 in the jaw A. The die faces are thus held accurately in a proper working relation to each other at all times, and the operation of the pin 7 within the slot 8 limits the separation of the jaws A and B so that the extension 11 of the jaw A is never moved entirely away from the ledge 10.

The first step in the formation of the tooth backing is to take a flat plate 15 of sheet gold, such as is shown by Fig. 7, and to double it around a wire 16, after which the doubled end of the gold plate, with the wire in position therein, is inserted between the opposed die faces 12, 12 of the jaws A and B and the said jaws forced together by manipulating the handle 5. This forces the doubled end of the gold plate tightly around the wire 16 in such a manner as to provide a web 17 and an enlarged rib 18 at the edge thereof. The projecting ends of the gold plate 15 are next separated and bent downwardly against the flat upper faces of the jaws A and B, as indicated on Fig. 5 by dotted lines, and lightly tapped with a hammer or similar instrument to accurately shape them in the desired manner.

The next step in the formation of the backings is to withdraw the wire 16 and fill the hollow rib 18 with a suitable substance such as gold solder 19, thereby producing a solid metal rib and securely fastening together the two portions of the web 17.

The third step in forming the artificial tooth backing is to shear or clip one end of the rib 18 and web 17, the web being removed for a greater distance than the rib so that the extremity of the rib projects slightly beyond the end of the web. For this purpose the jaws A and B are provided at one end thereof with the opposed horizontal shearing edges 20 which are flush with the top of the jaws, and the vertical shearing edges 21 which extend downwardly from the rear ends of the horizontal shearing edges 20. Immediately to the rear of the vertical shearing edges 21 the jaw A is provided with a laterally disposed punch 22 which has the same depth as the web 17 of the tooth backing, the end of the punch being received within the correspondingly shaped channel 23 in the jaw B. After the tooth backing has been shaped, as shown by Fig. 9, it is placed between the jaws at the end thereof provided with the shearing edges, the end of the plate 15 being arranged flush or even with the ends of the jaws. The said plate 15 is then held firmly in position by applying the pressure of a finger thereto, while the jaws are forced together by manipulating the handle 5. The horizontal shearing edges 20 then clip the end portion of the web 17 close to the back of the plate 15, while the vertical shearing edges 21 clip the end portion of the web 17 and rib 18 transversely, the severed portion of the gold dropping into a suitable receptacle which may be provided for the collection of these gold particles. At the same time, the punch 22 removes a further portion of the web 17, so that the end of the bit 18 projects beyond the end of the web 17. The tooth backing then has the form shown by Fig. 10.

The shearing operation frequently leaves the severed end of the web and rib with ragged edges, and in order to remove these ragged edges, as well as to swage or taper the projecting end of the rib 18, so that it will slip easily into the undercut groove of the well known Steele tooth facing, the opposite ends of the jaws A and B are provided with properly shaped die faces 24 for performing the final step in the operation. These die faces 24 are continuations of the die faces 12, although the grooved portion provided for the reception of the rib 18 is contracted in the die faces 24, as indicated at 24$^a$, thereby providing a construction which will swage and taper the projecting end of the rib 18 when the jaws A and B are forced together. The tooth backing is placed between the jaws with the edge thereof flush with the ends of the jaws, the said jaws being then forced together by manipulating the handle 5. The tooth backing then emerges in its final form, which is shown by Fig. 11.

By these several steps, as previously set forth, a solid gold one-piece artificial tooth backing is produced from a single piece of sheet gold, such as dentists ordinarily carry in stock, and it will be obvious that a one-piece backing plate is far superior to such a plate formed of separate elements connected by a joint, since with a one-piece construction there is practically no possibility of the web 17 being torn away from the plate. The provision of the shearing edges and punch for removing the end portion of the web and rib enables this operation to be performed with accuracy, and the portions of gold removed by the shearing edges may drop into a receptacle provided for receiving the same, while the gold particles removed by the punch 22 will collect in the channel 23, from which they can be readily removed, thereby avoiding the loss of any of the gold. The subsequent step of swaging and rounding the severed ends of the rib 18 eliminates the necessity of filing and fitting the devices by hand, such being objectionable for the reason that it consumes much time and results in the loss of gold. The backing plate produced by this process, and having the final form shown by Fig. 11, will fit the tooth facings with accuracy and ease, and there is no need for filing and grinding different parts of the device to bring about a fit. This tedious and expensive hand work is all avoided, and the tooth backings can be quickly and inexpensively produced without any waste of the gold, and without the expense which is always incident to special hand fitting.

Having thus described the invention, what we claim as new and desire to secure by Letters Patent, is:—

1. An apparatus for forming artificial tooth backings, including opposed and complemental jaw members movable toward and away from each other and having their upper faces in the same plane for engagement with the wings of a tooth backing to support the web and rib thereof between the jaw members, and means upon the opposed faces of the jaw members for cutting off one end of the rib and web and simultaneously removing an additional length of the web.

2. An apparatus for forming artificial tooth backings, including opposed and complemental jaw members movable toward and away from each other and having their upper faces arranged in the same plane for supporting the wings of a tooth backing with the web and rib thereof between the jaw members, coöperating shearing edges upon the opposed faces of the jaws, and a punch applied to the opposed faces of the jaws, the shearing edges and punch being arranged in a predetermined relation to the upper faces of the jaw members and to each other to cut off one end of the rib and web of the tooth backing and remove a greater length of the web than of the rib.

3. An apparatus for forming artificial tooth backings including opposed and complemental jaw members movable toward and away from each other and having their upper faces in the same plane for supporting the wings of an artificial tooth backing with the web and rib thereof between the jaw members, and intersecting horizontal and vertical shearing edges carried by the opposed faces of the jaw members, the horizontal edges being flush with the upper faces of the jaw members so that the shearing edges will remove a predetermined portion of the web and rib of the tooth backing.

4. An apparatus for forming artificial tooth backings, including opposed and complemental jaw members movable toward and away from each other and having their upper faces in the same plane for supporting the wings of an artificial tooth backing with the web and rib thereof between the jaw members, intersecting horizontal and vertical shearing edges carried by the opposed faces of the jaw members with the horizontal shearing edges flush with the upper faces thereof, and a laterally disposed punch also flush with the upper faces of the jaw members and arranged adjacent the vertical shearing edges, the shearing edges being adapted to remove an end portion of the web and rib of the backing, while the punch simultaneously removes an additional portion of the web.

5. An apparatus for forming artificial tooth backings including opposed and complemental jaw members movable toward and away from each other and having their upper faces in the same plane for supporting the wings of an artificial tooth backing with the web and rib thereof between the jaw members, intersecting horizontal and vertical shearing edges carried by the opposed faces of the jaw members and the horizontal shearing edges being flush with the upper faces of the jaw members and extending a predetermined distance from one end thereof, while the vertical shearing edges extend downwardly from the inner ends of the horizontal shearing edges, and a transverse punch mounted upon the jaw members and arranged flush with the top thereof and at the inner end of the horizontal shearing edges, the shearing edges serving to remove an end portion of the web and rib of the tooth backing, while the punch simultaneously removes an additional portion of the web.

In testimony whereof we have signed our names to this specification in the presence of two subscribing witnesses.

EDWIN N. RICH.
WILLIAM E. GROFF.

Witnesses:
A. M. BLOUNT,
W. I. MINOWITZ.